United States Patent

[15] 3,701,403

Peterson

[45] Oct. 31, 1972

[54] POSITIVE ENGAGEMENT CLUTCH

[72] Inventor: Earl A. Peterson, 4111 Chestnut Ave., Long Beach, Calif. 90813

[22] Filed: July 1, 1971

[21] Appl. No.: 158,703

[52] U.S. Cl.................192/38, 192/48.3, 192/56 R, 192/65, 192/72
[51] Int. Cl......F16d 43/21, F16d 11/06, F16d 13/14
[58] Field of Search......192/38, 45, 44, 47, 56 R, 65, 192/71, 72, 48.3

[56] References Cited

UNITED STATES PATENTS

| | | | |
|---|---|---|---|
| 185,696 | 12/1876 | Peppard | 192/45 |
| 531,596 | 12/1894 | Paterson | 192/45 |
| 1,373,810 | 4/1921 | Hansen | 192/65 X |
| 2,050,910 | 8/1936 | Zancan | 192/56 R X |
| 3,279,571 | 10/1966 | Wassilieff | 192/38 |
| 3,319,751 | 5/1967 | Sacchini | 192/56 R X |
| 3,610,379 | 10/1971 | Courtenay | 192/38 X |

*Primary Examiner*—Allan D. Herrmann
*Attorney*—Spensley, Horn & Lubitz

[57] ABSTRACT

A clutch for providing positive engagement between a driving and driven member. A driving member having tapered V-block cams and aligned tapered rollers in registration therewith are suitably journeled about a hub having a slidably engaged wedge ring adapted to be received by the tapered rollers. Irrespective of whether or not the driving member is in a dynamic or static position, axial movement of the wedge ring against the supported rollers establishes positive engagement between the rollers and the V-block cams providing for the transmission of power from the driving member to the driven member and the supporting shaft. To compensate for the shock inherent in the positive engagement of moving loads or where high inertia loads are moved from zero velocity, shock absorbing members are disposed immediate the wedge ring and supporting hub.

28 Claims, 6 Drawing Figures

PATENTED OCT 31 1972

EARL A. PETERSON
INVENTOR

BY

SPENSLEY, HORN & LUBITZ
ATTORNEYS

EARL A. PETERSON
INVENTOR

BY

SPENSLEY, HORN & LUBITZ
ATTORNEYS

EARL A. PETERSON
INVENTOR

BY

SPENSLEY, HORN & LUBITZ
ATTORNEYS

3,701,403

POSITIVE ENGAGEMENT CLUTCH

BACKGROUND OF THE INVENTION

1. Field of the Invention

The present invention positive engagement clutch is generally related to the field of mechanical clutches and, more particularly, to those mechanical clutches adapted to positively engage dynamic or high inertia loads.

2. Prior Art

The ability to transmit power from one rotating member to another through the use of a mechanical clutch is well known as disclosed in the prior art. The manner in which a driving member is engaged or otherwise coupled to a driven member is the subject of various types of equipment, each of which possess their own characteristics and problems. The particular types of mechanical clutches which would in any way relate to the present invention are those clutches which provide for a positive engagement between a driving and driven member rather than the type of engagement inherent to such devices as disc clutches.

A typical clutch disclosed by the prior art for making a positive engagement between a pair of rotating members utilizes a positioning of wedges between a housing and a shaft. In this device disclosed by the prior art, a set of push-pins are used to axially move a plurality of wedged shaped members into slots disposed in a ring gear, the movement of the wedges forcing the circumferentially disposed rollers down upon a shaft. After the push-pins have fully engaged the wedges, the rollers are jammed between the wedges and the shaft thereby providing for positive engagement of the clutch. To disengage the wedges and therefore the clutch, alternatively directed push-pins can move the wedges out. The problems inherent in this device are obvious. The engagement of the clutch is dependent upon the transmission of power from the housing through the wedges, the radially disposed rollers and to the shaft. The coupling between the bottom surface of the wedges and the roller would limit use of this mechanical clutch to nominal loads. In addition, there is no facility to dynamically engage or disengage the clutch. Lastly, this device disclosed by the prior art contains no means for absorbing any shock in the event the clutch is called upon to initiate the rotation of high inertia loads or be engaged dynamically.

Another device disclosed by the prior art for providing a positive engagement between a driving and driven member utilizes a plurality of rollers mounted in an annular cage arranged for annular motion between the driving and driven members. This device wedges the rollers between wedge shaped openings in an outer race and the annularly disposed inner race. When the rollers become jammed into the wedged shaped openings, power is transmitted from the driving to the driven member. This device provides for rotation in only a single direction thereby providing for action similar to those devices conventionally referred to as one-way clutches. This device leaves substantially problems left unresolved. Since it is desired to have a clutch which can engage or disengage a dynamic load, or initiate the operation of a high inertia load, the device must be able to operate in a bi-directional manner and be able to engage or disengage at any point in the rotation of the driving and driven members. In this device disclosed by the prior art, the operation is uni-directional and the ability to engage and disengage high rotational power sources under dynamic conditions is absent.

There are other devices disclosed by the prior art for transmitting power from a driving to a driven member in a uni-directional manner, these mechanical clutches typically being referred to as over-running or one-way clutches. All of these devices leave substantial problems unresolved. In the case where it is desired to engage a constant speed power source, the devices disclosed by the prior art typically require that there be synchronization between the driving and driven members prior to engagement or disengagement of the power source.

The present invention positive engagement clutch substantially solves the problems left unresolved by the devices disclosed in the prior art. The present invention utilizes the transmission of power between an outer housing having annularly supported V-block cams and aligned frusto-conical rollers and an inner hub having an axially slidable wedge ring adapted to be cooperatively received by the frusto-conical roller. Engagement of the wedge ring, frusto-conical rollers and the V-block cam provide for positive engagement irrespective of whether or not the driving member is in a dynamic condition or where the driven member is coupled to a high inertia load.

SUMMARY OF THE INVENTION

The present invention comprises a positive engagement clutch for permitting transmission of power between rotating members during dynamic or high inertia conditions. The clutch housing is adapted to be driven by any suitable rotating power source. The housing has an interior cavity which is substantially cylindrical, the housing being journeled on the clutch hub by suitable bearings. Depending radially inward from the interior periphery of the clutch housing are a plurality of V-block cams. The number of V-block cams is such that the configuration is symmetrical. The V-block cam assembly comprises the cam itself which is an inverted "V" with respect to an axial cross-section and is tapered at a predetermined angle with respect to the axis of the clutch. Substantially aligned with the apex of the V-block cam is a tapered roller which is substantially frusto-conical in shape, the axial taper of the roller being adapted to be received by the V-block cam. A pair of retainer springs maintain the quiescent radial position of the tapered rollers and a pair of bias springs maintain the radial stability of the rollers prior to and during engagement.

The driven member is keyed to the hub of the present invention positive engagement clutch. A wedge ring is slidably engaged to the hub of the clutch, the wedge ring being adapted to cooperatively engage the tapered roller wedging same between the V-block cam and the wedge ring. The wedge ring is axially tapered in a manner similar to that of the V-block cams. In a typical implementation to engage the present invention positive engagement clutch, a thrust ring secured to the hub is actuated axially and thereby moves the wedge ring into cooperative engagement with the tapered rollers. The engagement between the axial taper of the roller and wedge ring causes the rollers to move radially outwardly until the rollers engage the respective V-block cams. The bias springs act to retard the radial movement of the rollers and therefore the force imposed thereby is countered by the movement resulting from the wedge ring action. After the wedge ring is in place, the tapered rollers would be circumferentially wedged between the contacting surfaces of the wedge ring and the V-block cams. The wedge angle of the V-block cams with respect to the wedge ring is selected appropriately such that the tapered rollers will neither be self-locking nor require the imposition of an inordinate amount of force to maintain engagement. By proper selection of the circumferential wedge angles and the axial wedge angles between the wedge ring, tapered rollers and V-block cams, the clutch can be engaged and disengaged at any time during static or dynamic condition.

Typical applications of the present invention positive engagement clutch allows use of the same with power sources or loads which could not be adequately handled by mechanical clutches disclosed by the prior art. An example of the type of power source with which the present invention positive engagement clutch could be used is a gas turbine which could necessitate the transmittal of power in excess of 30,000 horsepower. Where it is desired to initiate the rotation of high inertia loads, the present invention positive engagement clutch would be used in such applications as providing the power transmission between an appropriate source and the propulsion members, reduction gear, shaft and propeller of a vessel. In either of these two conditions, the stress employed upon the mechanical clutch is such that the devices disclosed by the prior art would be substantially inadequate. Under these conditions, the wedge ring would be coupled to the hub of the clutch by a shock absorbing member. The shock absorbing member could be implemented through polyurethane dogs or a shock absorbing disc pack which is pre-set to slip at selected torque level.

It is therefore an object of the present invention to provide an improved mechanical clutch.

It is another object of the present invention to provide a positive engagement clutch capable of dynamically engaging constant speed power sources.

It is still another object of the present invention to provide a positive engagement clutch for engaging high inertia loads.

It is yet another object of the present invention to provide a positive engagement clutch capable of absorbing dynamically imposed loads up to pre-set torque levels.

It is still yet another object of the present invention to provide a positive engagement clutch capable of engaging or disengaging irrespective of the dynamic or static conditions of the power source or loads.

The novel features which are believed to be characteristic of the invention, both as to its organization and method of operation, together with further objectives and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DESCRIPTION OF THE PRESENTLY PREFERRED EMBODIMENT

Figure 1:
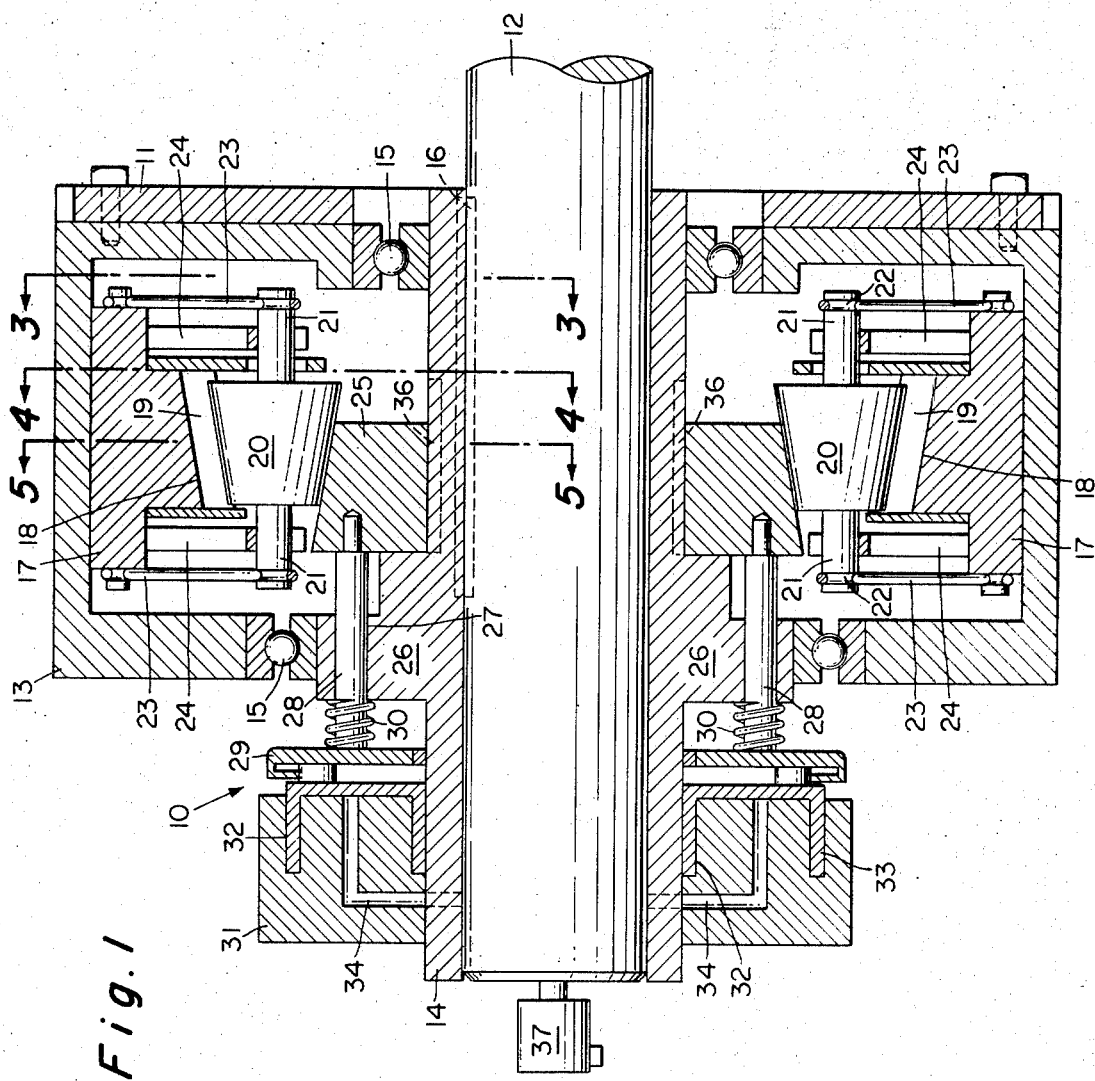
FIG. 1 is a cross-sectional view of a positive engagement clutch in accordance with the present invention.

An understanding of the present invention positive engagement clutch can be best gained by reference to FIG. 1 wherein a cross-sectional view of a form of the present invention positive engagement clutch is shown therein generally designated by the reference numeral 10. The clutch 10 will transmit the power from drive ring 11 to shaft 12 by positive engagement of the clutch members as opposed to frictional engagement. Drive ring 11 is coupled to clutch housing 13 which is suitably journeled upon hub 14 by bearings 15. Shaft 12 is secured to hub 14 at key slot 16.

Clutch housing 13 has an interior cavity which is substantially cylindrical in shape. V-block cams 17 are radially secured by conventional means to the interior peripheral surface of clutch housing 13 in a symmetrical manner. Although the scope of the present invention encompasses the use of a single cam ring having cam surfaces disposed therein or any practical number of symmetrically disposed V-block cams 17, a preferred form of the present invention utilizes three symmetrically coupled V-block cams 17. Each cam 17 is axially tapered at surface 18, the transverse profile of each cam 17 being an inverted V-shaped structure having depending surfaces 19.

Each V-block cam 17 has associated therewith a tapered roller 20 being substantially frusto-conical in shape. The axial taper of roller 20 is adapted to be cooperatively received by axial tapered surface 18 and the surfaces 19 of V-block cam 17. The relationship between the tapered surfaces of roller 20 and V-block cam 17 shall be more fully explained hereinbelow.

Axially depending shaft members 21 extend outwardly from each of the opposing surfaces of roller 20 for aligning roller 20 in proper registration with respect to V-block cam 17. The end of each extended shaft member 21 has an annular channel 22 disposed therein, retainer spring 23 being suspended from the axially opposed surfaces of V-block cam 17 to maintain the relative radial position of roller 20 with respect to V-block cam 17. Retainer springs 23 aid in maintaining the alignment of rollers 20 during the engagement and disengagement of the present invention positive engagement clutch 10.

Bias springs 24 bear upon extended shaft members 21 of tapered rollers 20 to maintain a radially inward force upon tapered rollers 20 in opposition to the centrifugal force arising out of rotation of clutch housing 13. As will be explained hereinbelow, bias springs 24 maintain the cooperative engagement of tapered rollers 20 and wedge ring 25 during engagement of the present invention clutch 10. Bias springs 24 typically comprise resilient metallic bands each end of which are coupled to the circumferential ends of V-block cams 17. The profile of bias springs 24, as will be explained in connection with FIG. 3, maintains a radially inward force against shafts 21 of tapered rollers 20 which maintain the proper alignment of tapered rollers 20 during engagement and disengagement of clutch 10.

Wedge ring 25 is slidably coupled to clutch hub 14, wedge ring 25 capable of being slidably moved axially along clutch hub 14 but being secured to prevent circumferential movement of wedge ring 25 with respect to clutch hub 14. Wedge ring 25 is coupled to clutch hub 14 by spline teeth 36 or other conventional couplings which will permit axial movement while retarding circumferential movement of the two engaging members.

Flanges 26 extend radially outward from clutch hub 14, flanges 26 having disposed therein arranged orifices 27, each orifice 27 being in alignment with an end of wedge ring 25. Push rods 28 are disposed within each orifice 27 and slidably extend therethrough to abut the longitudinal end of wedge ring 25. It can be seen from FIG. 1 that clutch 10 is in the disengaged position and therefore when push rod 28 is urged axially to the right it will cause wedge ring 25 to be axially moved in a like manner.

A typical member for actuating clutch 10 is shown in FIG. 1. Thrust ring 29 is slidably mounted upon clutch hub 13 in the axial direction, thrust ring 29 bearing against and being secured to push rod 28. Helicial spring 30 is disposed about a portion of push rod 28 disposed between flange 26 and the surface of thrust ring 29. As will be explained below, when clutch 10 is to be disengaged, spring 30 will expand withdrawing push rod 28 and the coupled wedge ring 25.

As stated, any suitable mechanism may be used for actuating clutch 10 such as the hydraulic actuator shown in FIG. 1. Thrust ring 29 is concentrically disposed about clutch hub 14 and is engaged thereto to permit insertion and withdrawal of push rod 28. A typical manner for actuating the present invention clutch 10 is shown in FIG. 1. Hydraulic housing 31 is secured to clutch hub 14, hydraulic housing 31 having disposed therein concentric channels 32 within which is slidably engaged piston 33. Piston 33 is a U-shaped member adapted to be slidably received within concentric channels 32. Hydraulic duct 34 carries the fluid coupled from roto-coupling 37 and connected thereto through internal lines of clutch hub 14 (not shown).

The present invention clutch 10 is actuated through the action of the hydraulic fluid through duct 34 bearing against the inner surface of piston 33. The piston 33 slidably engages the outer surface of clutch hub 14 bearing against thrust bearing 35 applying the axial force to thrust ring 29. The force imposed by piston 33 is transmitted to push rod 28 urging wedge ring 25 to contact the frusto-conical surface of tapered roller 20. Where drive ring 11 provides rotational power to the present invention clutch, the wedging action of the tapered roller between wedge ring 25 and V-block cam 17 will act to transmit the power from drive ring 11 to shaft 12.

A principal utilized by the present invention clutch is based upon the axial and circumferential wedging action between wedge ring 25, tapered roller 20 and V-block cam 17. The engagement or disengagement of the present invention clutch 10 under dynamic conditions or where high interia loads are involved, is based upon the capability of wedge ring 25 to urge tapered roller 20 against V-block cam 17, tapered roller 20 being wedged therebetween without creating conditions whereby wedge ring 25 or tapered roller 20 are in a self-locking mode. The particular members must be able to be engaged and disengaged at any time to meet an object of the present invention.

Figure 2:
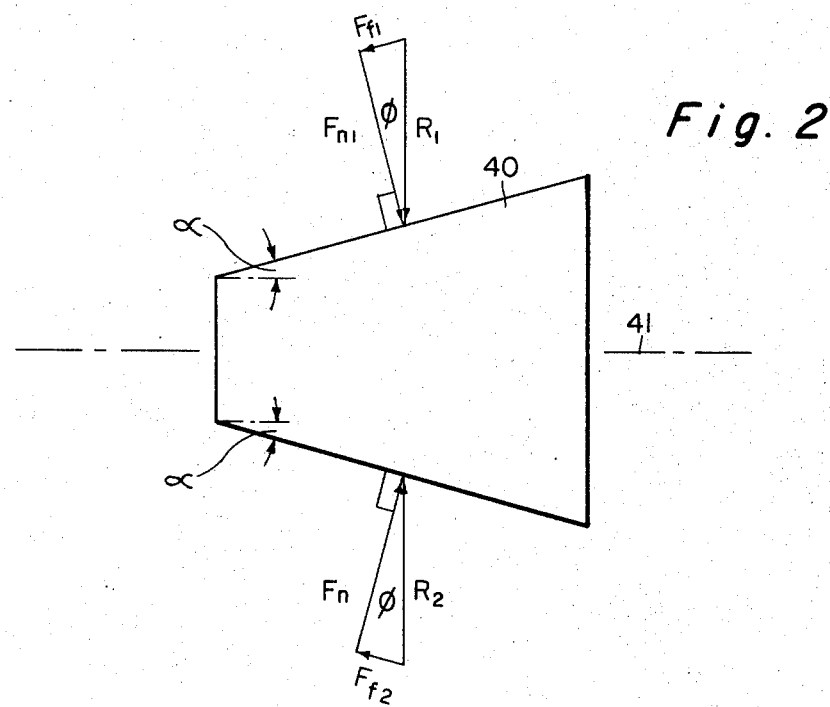
FIG. 2 is a schematic diagram of the tapered roller of FIG. 1 illustrating the vectorial forces imposed thereon under self-locking conditions.

An understanding of the mathematical theory underlying the principal of the present invention can be best seen by reference to FIG. 2 wherein a schematic, vector diagram illustrating the forces imposed upon a wedge member is shown, the wedge member being generally designated by the reference numeral 40. Wedge member 40 is schematically depicted to represent tapered roller 20 of FIG. 1 to further illustrate the applicability of the theoretical principles set forth hereinbelow. The vector force diagram set forth in FIG. 2 comprises frusto-conical member 40 depicted in an equilibrium condition. Under equilibrium conditions, member 40 is considered to be in a self-locking mode whereby the forces imposed thereon will prevent dislodgment of member 40 from the members binding same above and below. For the sake of simplification, the upper surface of member 40 is designated as surface 1 and the bottom surface thereof designated as surface 2. The sliding motion of member 40 along the interface thereof, results in a normal force ($F_{n1}$) and a frictional force ($F_{f1}$) which have a resultant ($R_1$) acting at an angle from a plane perpendicular to surface 1. In a like manner, the sliding portion of member 40 will result in a normal force $F_{n2}$ and frictional force $F_{f2}$ with a resultant $R_2$ at an angle $\phi$ from the perpendicular place from surface 2. The angle $\phi$ is the friction angle at surfaces 1 and 2. For the sake of simplicity, the friction angles are considered to be equal. The relationship between the frictional force, normal force, and the friction angle are set forth as follows:

1. $F_{f1} = F_{n1} \tan\phi$
2. $F_{f2} = F_{n2} \tan\phi$

Where $\mu$ is the coefficient of friction at surfaces 1 and 2 of member 40; equations 1 and 2 become:

3. $F_{f1} = F_{n1}\mu$
4. $F_{f2} = F_{n2}\mu$

Since the wedge system illustrated in FIG. 2 is assumed to be in equilibrium, equation 5 set forth hereinbelow identifies the algebrais solution of the vector diagram set forth in FIG. 2 along the horizontal axis 41:

5. $F_{n1}\cos(\pi/2-\alpha) - F_{n1}\mu\cos\alpha + F_{n2}\cos(\pi/2-\alpha) - F_{n2}\mu\cos\alpha = 0$ Since member 40 is also considered to be in vertical equilibrium, equation 5 reduces to that set forth in equation 6:

6. $\cos(\pi/2-\alpha) = \mu \cos\alpha$

Solving equation 6 for $\alpha$:

7. $\alpha = \arctan \mu$

Since it is desired to theoretically identify a system which will not be self-locking, equation 8 must be changed to the following inequality:

8. $\alpha > \arctan \mu$

The relationship set forth in equation 8 illustrates that the wedge angle of member 40 is substantially dependent upon the coefficient of friction at the wedge surfaces. This amply illustrates that the materials selected for the implementation of wedge ring 25, tapered roller 20 and V-block cam 17 of FIG. 1 substantially determine the required wedge angle between tapered roller 20 and wedge ring 25, and as will be explained below, the angles of V-block cam 17 and tapered roller 20. Based upon equation 8, the system will not reach a self-locking condition so long as the wedge angles are greater than the angle whose tangent is equal to the coefficient of friction at the wedge surfaces.

Figure 3:
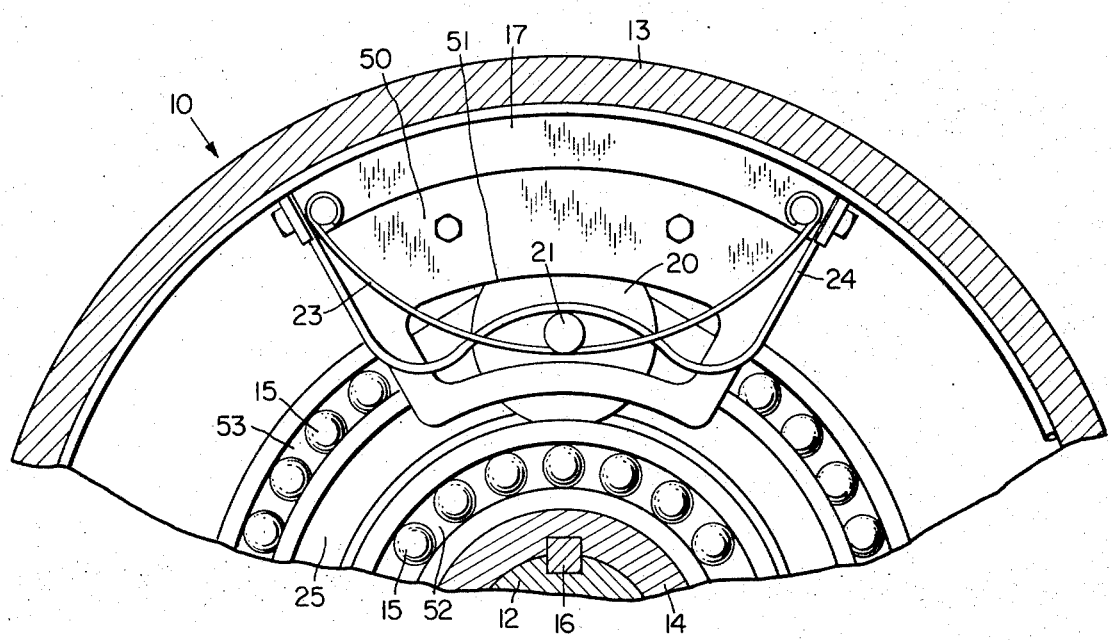
FIG. 3 is an enlarged view of the V-block cam and tapered roller assembly of FIG. 1 taken through line 3—3 of FIG. 1.

An understanding of the V-block cam assembly can be best understood by reference to FIG. 3 wherein a partial, cross-section of the present invention clutch 10 can be best seen. The cross-sectional view of the V-block cam is taken through line 3—3 of FIG. 1 and illustrates the cooperative relationship between the V-block cam 17, tapered roller 20, retainer spring 23 and bias spring 24 prior to engagement of the present invention clutch 10. As shown in FIG. 3, clutch housing 13 has depended from the inner cavity thereof an assembly comprising V-block cam 17 and tapered roller 20. Referring now to FIG. 3, retainer plate 50 is coupled to V-block cam 17 symmetrically about the inverted, tapered "V" section to be explained in detail below. Retainer plate 50 is coupled to V-block cam 17 by bolts or other conventional coupling devices. Retainer plate 50 has disposed therein aperture 51 bounded by symmetrical radial portions of retainer plate 50. Aperture 51 substantially restricts the lateral movement of extended shaft member 21 of tapered roller 20 as well as preventing inadvertent radial movement. The lateral movement permitted extended shaft member 21 is sufficient to allow engagement of tapered roller 20 to V-block cam 17 while permitting suitable lateral movement thereof.

Coupled to the two axial faces of V-block cam 17 are retainer springs 23. As seen in FIG. 3, retainer spring 23 is symmetrical about the unengaged position of tapered roller 20 and passes under extended shaft member 21 of tapered roller 20. A pair of retainer springs 23 are used to support tapered roller 20 as can be seen in FIG. 1. Retainer spring 23 maintains the relative radial position of tapered roller 20 with respect to V-block cam 17 while the present invention clutch 10 is disengaged and aids in maintaining the position of tapered roller 20 during engagement of the clutch. To maintain the proper alignment of tapered roller 20 against wedge ring 25 during engagement of clutch 10, bias spring 24 is supported at the circumferential ends of V-block cam 17 and is sufficiently long to provide a radially inward force against extended shaft member 21 when the center thereof is positioned adjacent the radially outward edge of extended shaft member 21 of tapered roller 20. As can be seen in FIG. 1 and FIG. 3, bias springs 24 are typically fabricated of bands of conventional resilient, metallic material and support both axial ends of tapered roller 20.

The cross-sectional view of the present invention clutch 10 as seen in FIG. 3 partially illustrates shaft 12 as it is engaged to clutch hub 14 at key slot 16. As mentioned, clutch housing 13 is journeled about clutch hub 14 on suitable bearings 15. As seen in FIG. 3, bearings 15 are uniformly distributed along ball race 52 and ball race 53.

Figure 4:
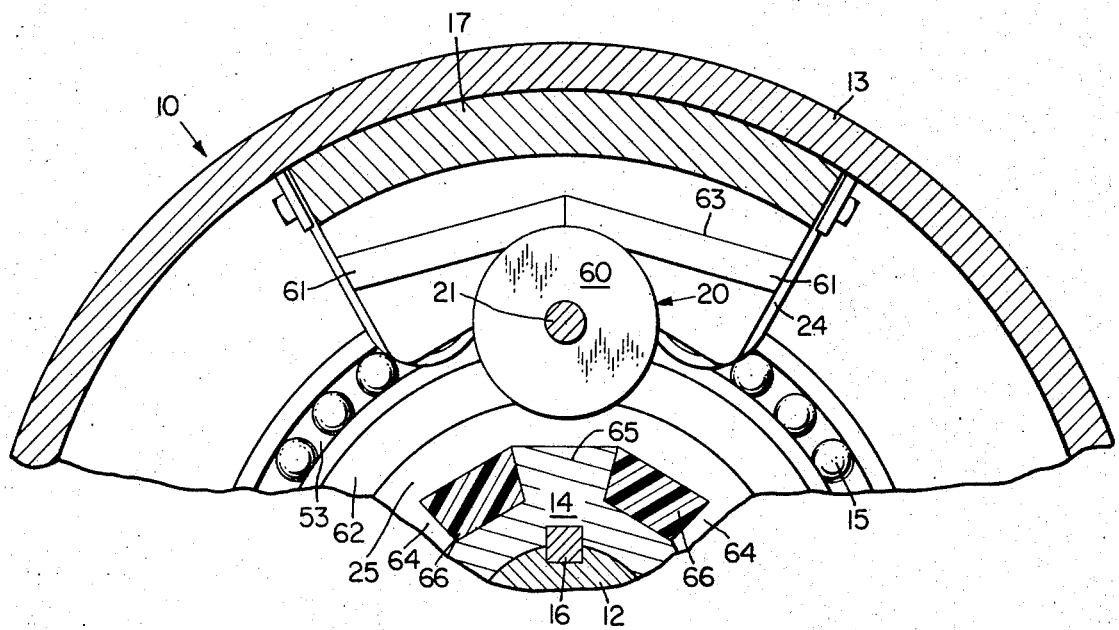
FIG. 4 is an enlarged view of the V-block cam and tapered roller of FIG. 1 taken through line 4—4 of FIG. 1 illustrating a shock absorbing coupling in accordance with the present invention.

An understanding of the relationship between tapered roller 20 and V-block cam 17 of FIG. 1 can be best seen by reference to FIG. 4 wherein a cross-sectional view of the profile of the interface can be best seen. Tapered roller 20 is a frusto-conical member, FIG. 4 illustrating the base 60 of tapered roller 20. V-block cam 17 is coupled to the surface of the inner cavity of clutch housing 13. V-block cam 17 comprises a portion thereof for mounting bias springs 24 and retainer springs 23 (FIG. 3), and tapered V sections 61 are symmetrically disposed in V-block cam 17 having a profile substantially resembling an inverted "V" structure. Although the scope of the present invention encompasses a clutch utilizing a cam having a single tapered section 61 for operation as a one-way clutch, the preferred embodiment of the present invention clutch 10 employs a V-block cam 17 as shown in FIG. 4.

As shown in FIG. 4, in the unengaged condition, tapered roller 20 is symmetrically disposed with respect to tapered "V" surfaces 61 of V-block cam 17, the symmetrical relationship being maintained by bias spring 24 and retainer spring 23 (not shown). As discussed with respect to FIG. 2, the contact to be made between a tapered "V" surface 61 and the frusto-conical surface of tapered roller 20 must be appropriately selected to avoid a self-locking mode whereby tapered roller 20 will become jammed between tapered surface 61 and the mating tapered surface 62 of wedge ring 25. The appropriate wedge angle constitutes that between an extension of line 63 and a tangent drawn to tapered surface 62 perpendicular to a line bisecting the angle between tapered surfaces 61 of V-block cam 17. Although the planes of contact between surfaces 61 and 62 with the frusto-conical surface of tapered roller 20 are not parallel, the principle disclosed with respect to that shown in FIG. 2 is equally applicable in this case. Since the tapered surfaces must be selected to avoid any self-locking mode, the angle of tapered surfaces 61 both in the axial and circumferential directions must be selected in accordance with equation 8. Since the wedge angle is a function of the coefficient of friction between the wedge surfaces, the wedge angles are a function of the material selected. Where high strength carbon steel is used, the appropriate axial and circumferential wedge angles are preferably in the range of 14°–15°. Although it is within the scope of the present invention to implement the present invention clutch 10 with any appropriate structure material, the preferred embodiment of the present invention utilizes high strength carbon steel due to the loads and the forces to be imposed upon the system. It is also understood that where other materials are selected, the wedge angle between tapered roller 20 and the receiving surfaces 61 and 62 of cam 17 and wedge ring 25 respectively will be adjusted appropriately based upon the coefficient of friction at the wedge surfaces.

In the embodiment of the invention shown in FIG. 4, an alternative form for coupling clutch hub 14 and wedge ring 25 is shown. An object of the present invention is to provide a positive engagement clutch capable of engagement and disengagement under dynamic conditions. Under conditions where the clutch housing is rotating prior to engagement or where a high inertia load is to be started, substantially mechanical shock will have to be absorbed by the clutch prior to reaching an equilibrium condition. In the form of the present invention shown in FIG. 4, wedge ring 25 is coupled to clutch hub 14 through a series of axially extending members or dogs 64 depending radially inwardly from wedge ring 25 and axially extending members or dogs 65 depending outwardly from clutch hub 14, dogs 64 and 65 being in juxtaposition with energy absorbing shock blocks 66. Shock blocks 66 are fabricated of suitable shock absorbing materials such as rubber, metallic springs, but they are preferably fabricated of polyurethane. In the form of the present invention shown in FIG. 4, when the present invention clutch 10 is engaged, rotational power will be transmitted through V-block cam 17, tapered roller 20 to wedge ring 25. Any shock incident to engagement of the system will be absorbed by shock blocks 66 thereby permitting safe transmission of power to clutch hub 14 and to shaft 12.

Figure 5:
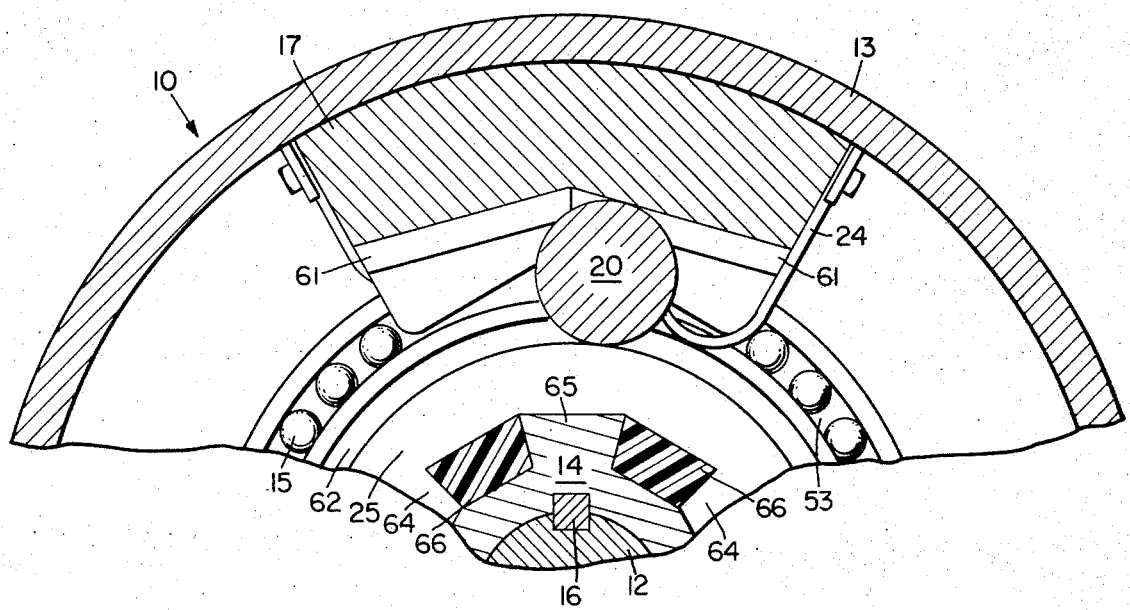
FIG. 5 is an enlarged, cross-sectional view of the V-block cam, tapered roller and wedge ring of FIG. 1 taken through line 5-5 of FIG. 1, the clutch being in the engaged position.

An understanding of the manner in which positive engagement is achieved by the present invention clutch 10 can be best seen by reference to FIG. 5 wherein a cross-sectional view of the engaged wedge ring 25, tapered roller 20 and V-block cam 17 can be best seen. FIG. 5 is a cross-sectional view of the present invention clutch 10 taken through line 5—5 of FIG. 1. The structure shown in FIG. 5 illustrates the cooperative engagement of the elements after engagement of clutch 10, the configuration shown assumes counter-clockwise rotation of drive ring 11 (FIG. 1) and therefore clutch housing 13. Wedge ring 25 is moved axially to the right (FIG. 1) cooperatively engaging the frusto-conical surface of tapered roller 20 urging tapered roller 20 to move radially outward until the frusto-conical surface of tapered roller 20 is in juxtaposition with one of the tapered V sections 61 of V-block cam 17. Where counter-clockwise rotation of clutch housing 13 is assummed, tapered roller 20 will be wedged between tapered surface 62 of wedge ring 25 and the right hand tapered section 61 of V-block cam 17. As can be seen in FIG. 5, the present invention clutch 10 is fully engaged since the full axial distance of tapered surface 62 is coincident with the receiving portion of the frusto-conical surface of tapered roller 20. In addition, the respective tapered surface 61 of V-block cam 17 is fully in contact with the receiving frusto-conical surface of tapered roller 20. As discussed, retainer spring 24 is utilized to maintain the relative contact between the frusto-conical surface of tapered roller 20 and tapered surface 22 of wedge ring 25 during engagement of the present invention clutch 10. Since counter-clockwise rotation of clutch hub 13 will result in the wedged configuration shown in FIG. 5, retainer spring 24 will be deformed to adapt to the laterally off-set position of tapered roller 20.

The configuration of wedge ring 25, tapered roller 20 and V-block cam 17 as shown in FIG. 5, utilizes the principle described in connection with FIG. 2. Tapered roller 20 must be lodged between tapered surfaces 61 and 62 of V-block cam 17 and wedge ring 25 respectively in a manner which will prevent the creation of a self-locking mode. As can be seen in FIG. 5, the frusto-conical surface of tapered roller 20 is fully engaged with tapered surfaces 61 and 62 thereby forming the described wedge. The transverse wedge angle between a projection of tapered surfaces 61 at edge 63 and a tangent to tapered surface 62 at the point where the angle between tapered surfaces 61 are bisected, must be adapted to comply with the requirements of the critical wedge angle. Pursuant to equation 8 set forth hereinabove, the angle described must be greater than the angle whose tangent is equal to the coefficient of friction at the respective contacting wedge surfaces. Where the respective engaging members are fabricated from high strength carbon steel, the coefficient of friction between the engaging surfaces will typically require that the stated wedge angle be substantially in the range of 14°–15° of arc. It is of course understood that where the material used to implement the respective members are different from that identified, or where appropriate lubricants alter the coefficient of friction between the engaging members, the wedge angles described will be altered in accordance with that set forth in equation 8.

In addition to insuring that tapered roller 20 does not become self-locking between wedge ring 25 and V-block cam 17, the wedge angle between surfaces 61 and the tangent to the stated location of wedge ring 25 cannot be so great to prevent wedging action. Referring to FIG. 2, the wedging force forces are comprised of both a force normal to the surface as well as a frictional force along the wedging surface. Where the angle becomes excessively great, the frictional force will become substantially equal to zero thereby creating the condition whereby no wedging action will occur. Referring again to FIG. 5, where the angle between the projection of tapered surface 61 at edge 63 and the tangent to the appropriate location of wedge ring 25 becomes excessively great, tapered roller 20 will not be wedged between surfaces 61 and 62, but instead will be caused to rotate along the engaging surfaces. As stated, this result will be substantially due to the elimination of the frictional force between the engaging elements. Although it is within the scope of the present invention to utilize any materials and wedge angles which are appropriately selected to allow tapered roller 20 to become wedged between surfaces 61 and 62 without becoming self-locked, a preferred embodiment of the present invention utilizes axial and lateral wedge angles which are in the range of 14°–15° of arc.

After wedge ring 25 has caused the engagement of the frusto-conical surface of tapered roller 20 and the cooperating tapered surfaces 61 and 62 of V-block cam 17 and wedge ring 25 respectively, the rotational power imposed upon clutch housing 13 can be transferred to the coupled shaft 12. The rotational force will be transmitted through V-block cam 17, tapered roller 20 to wedge ring 25. As can be seen in FIG. 5, wedge ring 25 is interlocked to clutch hub 14 through a series of dogs 64 and 65 in a like manner to that described with respect to FIG. 4. Dogs 64 and 65 are separated by adjacent shock absorbing blocks 66 which absorb the mechanical shock resulting from engaging the present invention clutch 10 during dynamic conditions. In addition, shock absorbing blocks 66 will allow engagement of high inertia loads from a static quiescent condition. Shock absorbing blocks 66 can be fabricated from conventional shock absorbing, resilient materials such as polyurethane. The power transmitted to clutch hub 14 is transmitted to shaft 12 which is keyed to clutch hub 14 through key slot 16.

Figure 6:
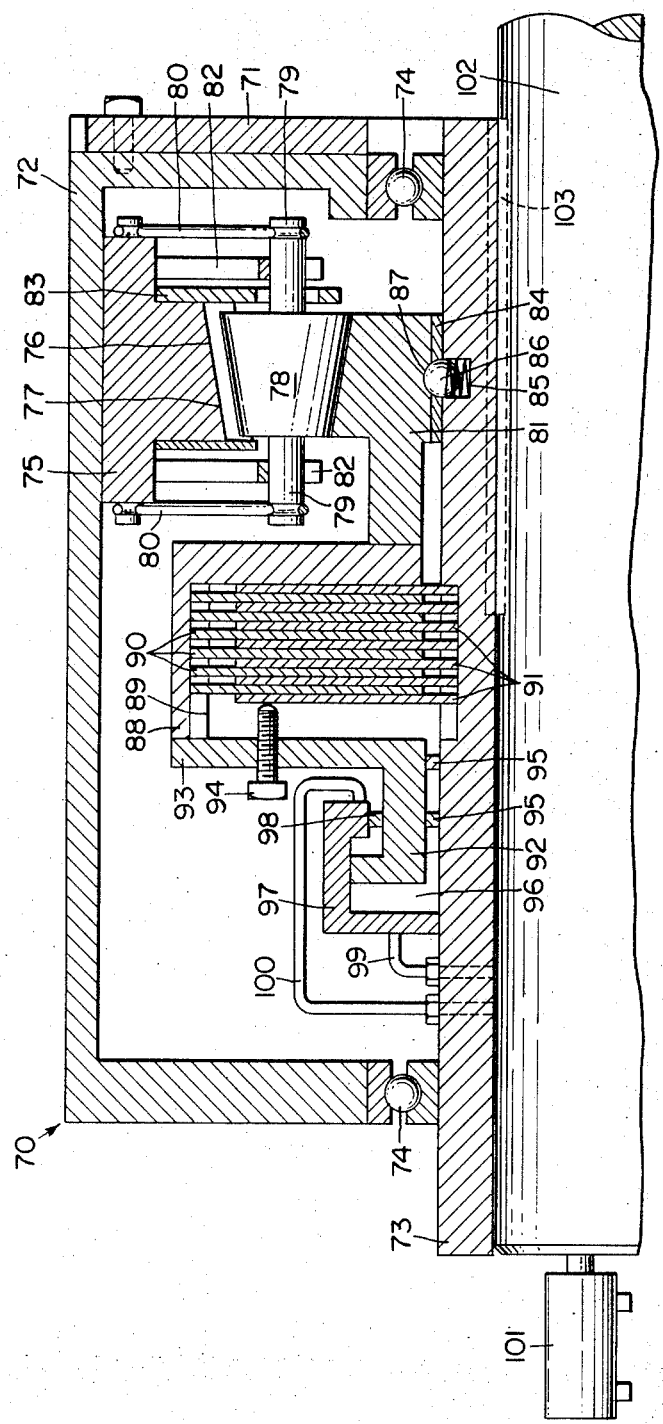
FIG. 6 is a partial, cross-sectional view of a positive engagement clutch in accordance with the present invention utilizing a shock absorbing disc pack.

Referring now to FIG. 6, another form of the present invention positive engagement clutch can be best seen, the clutch being generally designated by the reference numeral 70. Rotational power is supplied to clutch 70 by drive ring 71, drive ring 71 being coupled to clutch housing 72. Clutch housing 72 is a substantially cylindrical member which is journeled upon clutch hub 73 by suitable bearings 74. In a manner similar to that described with respect to FIG. 1, V-block cams 75 are coupled to the surface of the interior cavity of clutch housing 72 depending radially inward therefrom. In a manner similar to that in FIGS. 1, 3, 4 and 5, V-block cam 75 is axially tapered at surface 76 and is circumferentially tapered at surface 77. Extended from V-block cam 75 is tapered roller 78 having a substantially frusto-conical shape with extended shaft members 79 axially depending therefrom. The frusto-conical surface of tapered roller 78 is adapted to be cooperatively received by the axially and laterally tapered surfaces 76 and 77 of V-block cam 75. Extended shaft members 79 are supported at the ends thereof by retainer springs 80. As previously stated with respect to FIG. 1, retainer springs 80 are used to maintain the proper alignment of tapered roller 78 with respect to the inverted "V" tapered surfaces 77 of V-block cam 75. To provide for proper contact between tapered roller 78 and wedge ring 81 during engagement of clutch 70, bias springs 82 resiliently bear upon the outer surface of extended shaft members 79 in a manner similar to that shown in FIGS. 3, 4 and 5. Retainer plate 83 is securely coupled to an axial end portion of V-block cam 75, retainer plate 83 having an orifice disposed therein similar to that shown in FIG. 3. Retainer plate 83 will prevent undue lateral movement of tapered roller 78 during engagement of clutch 70. Although the preferred form of the present invention positive engagement clutch utilizes a plurality of independently disposed V-block cams 75, an integral concentrically disposed ring could be employed having symmetrically organized tapered surfaces 76 and 77 formed therein to implement the receiving cams.

The embodiment of the present invention clutch 70 shown in FIG. 6 is in the engaged mode whereby wedge ring 81 has been axially moved to the right until tapered roller 78 has been urged radially outward to provide contact between the frusto-conical surface of tapered roller 78 and the respective tapered surfaces of V-block cam 75 and wedge ring 81. The axial and lateral tapered surfaces of wedge ring 81 and V-block cam 75 are subject to the criteria described with respect to FIG. 2. The wedge angles are selected to comply with the requirements of equation 8 set forth hereinabove. As discussed, the wedge angles are selected to prevent self-locking while permitting wedging of tapered rollers 78. Under the conditions set forth in equation 8, the wedge angles of wedge ring 81, V-block cam 75 and the cooperating frusto-conical surface of tapered roller 78 are selected to insure that they are greater than an angle whose tangent is equal to the coefficient of friction at the wedging surfaces. It is within the scope of the present invention to fabricate the embodiment of the present invention clutch 70 of any appropriate structural materials, but the preferred embodiment is fabricated of high strength carbon steel which utilizes a wedge angle within the range of 14°–15π o of arc.

Referring again to FIG. 6, wedge ring 81 is slidably engaged to clutch hub 73 by appropriate bearings 74. Since the wedge angles are selected to prevent self-locking of wedge ring 81, the embodiment of the present invention clutch 70 is provided with annular channel 85 into which is disposed spring loaded ball 86. The interior surface of wedge ring 81 in slidable contact with clutch hub 73 is provided with annular disposed detent 87 adapted to cooperatively receive spring loaded ball 86. When the present invention clutch 70 is engaged, the cooperative relationship between detent 87 and spring loaded ball 86 will maintain engagement until deactuation is initiated. The manner of actuating and deactuating clutch 70 will be explained hereinbelow. The relationship between wedge ring 81, tapered roller 78 and V-block cam 75 during engagement is substantially the same as that shown in FIG. 5.

An object of the present invention is to permit positive engagement and disengagement of the clutch during dynamic conditions and where a high inertia load is to be statically engaged. In the embodiment of the present invention shown in FIG. 6, an axial end of wedge ring 81 is securely coupled to housing 88. Housing 88 is concentrically disposed about clutch hub 73 and has an interior surface 89 which is concentric with and parallel to clutch hub 73. Depending inwardly from surface 89 and concentrically disposed about clutch hub 73 are a plurality of parallel, equidistant discs 90 slidably engaged to housing 88 along the axis thereof. Friction discs 90 are fabricated of conventional heat dissipating material. Depending outwardly from and slidably engaged to clutch hub 73 along its axis are a plurality of parallel, equidistant friction discs 91 interstitially received by friction disc 90. Friction discs 90 and 91 provide a tortional coupling between wedge ring 81 and clutch hub 73. To provide for transmission of a predetermined torque level, piston 92 is concentrically and rotatably disposed upon clutch hub 73. Radially extending ring 93 of piston 92 is integrally connected to housing 88. In this manner, ring 93 of piston 92 is parallel with friction discs 90 and 91. A pre-set torque level can be achieved by providing bolt 94 or other adjusting means which is screwed into ring 93 of piston 92. Bolt 94 is forced in abutment with the end friction disc 91 increasing the frictional force between friction discs 90 and 91 until the present level is reached. Under these conditions, the rotational force provided by drive ring 71 will not be transmitted to clutch hub 73 unless the torque imposed is less than the pre-set level imposed by bolt 94 in conjunction with friction discs 90 and 91. This configuration yields a shock absorbing coupling between wedge ring 81 and clutch hub 73 to provide for absorbing the mechanical shock incident to dynamic engagement or the start-up of high inertia loads. Discs 90 and 91 can be implemented through the use of any conventional power dissipating surfaces, the number and size thereof being determined by the available space and material selected for implementation of same.

As stated hereinabove, actuation of the present invention clutch can be by any suitable means for providing axial movement of the appropriate element, such as manual, pneumatic or hydraulic actuating means. In the embodiment of the present invention illustrated in FIG. 6, piston 92 is concentrically disposed about clutch hub 73 and mounted upon slip ring 95. Slip rings 95 allow for rotation of piston 92 about clutch hub 73 while maintaining the integrity of hydraulic cylinder 96. Hydraulic housing 97 is concentrically disposed about clutch 73 and is coupled to an upper surface of piston 92 by an appropriate sealing slip ring 98. Cylindrical housing 97 and piston 92 form the hydraulic cylinder 96 therebetween. Hydraulic lines 99 and 100 provide the fluid lines for engaging and disengaging respectively the embodiment of the present invention clutch 70. Each hydraulic line 99 and 100 provides access to an appropriate cylinder area for bearing against a face of piston 92. Hydraulic lines 99 and 100 are coupled to clutch hub 73, the fluid being supplied thereto by conventional roto-coupling 101. The fluid path through clutch hub 73 is not shown.

Where the embodiment of the present invention clutch 70 shown in FIG. 6 is to couple the rotational power supplied by a constant speed source to loads such as a high inertia load, piston 92 will be urged axially to the right, friction discs 91 being slidably coupled to clutch hub 73 by spline teeth or other appropriate coupling devices. Wedge ring 81 engages tapered roller 78 urging tapered roller 78 radially outward until contact is made with V-block cam 75. The positive engagement of clutch 70 through the principle described in connection with FIG. 2 will impose a tortional force upon wedge ring 81 and the coupled housing 88. Since the load is considered to have high inertia such as that which would accompany the start-up of the propulsion members of a vessel, the tortional force imposed upon housing 88 will have to be dissipated by friction discs 90 and 91 if the torque exceeds the level which was pre-set by bolt 94 bearing against friction discs 90 and 91. Friction discs 90 and 91 will dissipate the tortional heat horsepower which exceeds the pre-set torque level, the remaining power being transmitted to clutch hub 73 and shaft 102. When shaft 102 reaches a velocity whereat the tortional power imposed is below the pre-set level, the dissipation of power by friction discs 90 and 91 will terminate. As shown, shaft 102 is coupled to clutch hub 73 at key slot 103.

Since the wedging elements comply with the requirement of equation 8, wedge ring 81, tapered roller 78 and V-block cam 75 will not be in a self-locking mode. When clutch 70 is engaged, detent 87 will be engaged by spring loaded ball 86 maintaining wedge ring 81 in proper alignment even if the clutch actuating power is removed or stopped. The engagement of detent 87 and ball 86 is broken upon actuating the hydraulic system urging piston 92 axially to the left.

Although the embodiments of the present invention illustrated in FIG. 1 and FIG. 6 utilize a configuration where the respective V-block cam is depended from the interior cavity of the clutch housing and the wedge ring is coupled to the clutch hub, it is within the scope of the present invention to reverse the placement of these elements. Under these conditions, the tapered roller would be coupled to the V-block cam by retainer and bias springs to provide proper alignment thereof as the roller is forced down upon the V-block cam by the wedge ring. It is also within the scope of the present invention to provide engagement and disengagement of the clutch by movement of the tapered roller itself rather than the wedge ring or V-block cam. Although it is within the scope of the present invention to utilize the alternative means to provide engagement and disengagement of the clutch, the preferred forms of the present invention are those set forth in FIG. 1 and FIG. 6 of the drawing.

The present invention positive engagement clutch substantially solves the problems which have heretofore been left unresolved. Where an application required the transmission of power from large constant speed power sources such as would be incident to gas turbines, the devices disclosed by the prior art have no means for substantially providing for direct positive engagement of a load without providing for expensive equipment for synchronizing or otherwise matching the power source and loads. The principle illustrated with respect to FIG. 2 enables the present invention positive engagement clutch to dynamically engage the disengage constant speed power sources to high inertia loads without the need for complicated and extensive procedures for synchronizing or reducing relative speeds between the power source and loads.

I claim:

1. A positive engagement clutch for transmitting rotational power comprising:
   a. a rotatable element having an axial bore therethrough;
   b. a rotatable housing rotatably mounted upon said rotatable element, said rotatable housing having an interior cavity bounding said rotatable element;
   c. a plurality of tapered cams circumferentially disposed about the interior cavity of said housing;
   d. a plurality of frusto-conical rollers, each resiliently coupled to one of said cams, the frusto-conical surface of said rollers adapted to be received by said cams;
   e. a tapered ring concentrically disposed about and coupled to said rotatable element, said tapered ring being adapted to be cooperatively received by said frusto-conical rollers; and
   f. means for engaging said clutch coupled to said tapered ring whereby said tapered ring is received by said frusto-conical rollers urging same to engage said cams.

2. A positive engagement clutch as defined in claim 1 wherein said frusto-conical rollers are axially tapered, the angle between said frusto-conical surface and the axis of said roller being greater than the angle whose tangent is equal in value to the coefficient of friction at said frusto-conical surface.

3. A positive engagement clutch as defined in claim 2 wherein said cam comprises a pair of surfaces tapered axially along and transverse to said housing, one of said surfaces being in intimate contact with the frusto-conical surface of said roller when said clutch is engaged.

4. A positive engagement clutch as defined in claim 1 wherein said tapered ring is a wedge ring slidably coupled to said rotatable member along the axis of said rotatable member.

5. A positive engagement clutch as defined in claim 4 wherein said wedge ring is slidably coupled to said rotatable member by interlocking, axially extending members having shock absorbing blocks disposed therebetween.

6. A positive engagement clutch as defined in claim 5 wherein said shock absorbing blocks are fabricated from polyurethane.

7. A positive engagement clutch as defined in claim 1 wherein said tapered ring is a wedge ring rotatably mounted about said rotatable member, a portion of said wedge ring being frictionally coupled to said rotatable member.

8. A positive engagement clutch as defined in claim 7 wherein said frictional coupling comprises a first plurality of friction discs concentrically disposed about and axially slidable along said rotatable member, and a second plurality of friction discs concentrically disposed about said rotatable member and interstitial with said first plurality of friction discs, said second plurality of friction discs being securely coupled to and moveable with said wedge ring.

9. A positive engagement clutch as defined in claim 8 including means for adjusting the friction between said first and second plurality of friction discs to a pre-set torque level.

10. In a positive engagement clutch for the transmission of power between a driving and driven member, means for engaging the driving and driven members comprising:
  a. a tapered wedge ring concentrically disposed about and slidably coupled to said driven member along the axis thereof, the outer surface of said wedge ring being axially tapered;
  b. a plurality of V-block cams uniformly disposed about said driven member and coupled to said driving member, said V-block cams being uniformly disposed about said driven member and having a pair of adjacent surfaces each tapered radially inward transversely from the center line of said cam and tapered axially with respect to said driven member; and
  c. a plurality of frusto-conical rollers, each of said rollers being in resilient registration with a pair of said adjacent surfaces of one of said V-block cams, said frusto-conical surface adapted to be cooperatively received by the tapered surfaces of said wedge ring and said V-block cam.

11. A frusto-conical roller as defined in claim 10 wherein said frusto-conical roller is axially tapered, the tapered angle between said frusto-conical surface and the axis of said roller being greater than the angle whose tangent is equal in value to the coefficient of friction at the frusto-conical surface.

12. A positive engagement clutch as defined in claim 10 wherein said wedge ring is slidably coupled to said driven member by interlocking, axially extending dogs having shock absorbing blocks disposed therebetween.

13. A positive engagement clutch as defined in claim 12 wherein said shock absorbing blocks are fabricated from polyurtherine.

14. A positive engagement clutch as defined in claim 10 wherein said wedge ring is rotatably mounted about said driven member, a portion of said wedge ring being frictionally coupled to said driven member.

15. A positive engagement clutch as defined in claim 14 wherein said frictional coupling comprises a first plurality of friction discs concentrically disposed upon and axially slidable along said driven member and a second plurality of friction discs concentrically disposed about said driven member and interstitial with said first plurality of friction discs, said second plurality of friction discs being securely coupled to and moveable with said wedge ring.

16. A positive engagement clutch as defined in claim 15 including means for imposing an axial force upon said first and second plurality of friction discs whereby a pre-set torque level is established.

17. A positive engagement clutch for transmitting rotational power from a power source to a driven shaft comprising:
  a. a rotating member having an axially disposed bore, the shaft being coupled to said rotating member within said bore;
  b. a housing secured to the power source and journeled on said rotatable member, said housing having a substantially cylindrical inner cavity concentrically disposed about said rotatable members;
  c. V-block cams secured to and uniformly disposed about the inner surface of said housing and having a pair of adjacent surfaces each tapered radially inward transverse from the center line of said cam and tapered axially with respect to said rotating member;
  d. a tapered wedge ring concentrically disposed about and slidably coupled to said rotating member along the axis of said rotating member, the outer surface of said wedge ring being axially tapered;
  e. a frusto-conical roller in resilient registration with a pair of said adjacent surfaces of each of said cams, said frusto-conical roller being axially tapered, the tapered angle between said frusto-conical surface and the axis of said roller being greater than the angle whose tangent is equal in value to the coefficient of friction at said frusto-conical surface, whereby said frusto-conical roller is cooperatively received between one of said pair of adjacent surfaces of said cam and said tapered wedge ring when said clutch is engaged; and
  f. means for slidably moving said wedge into engagement with said frusto-conical rollers whereby said frusto-conical is urged radially outwardly into contact with respective cams.

18. A positive engagement clutch as defined in claim 17 wherein said wedge ring is slidably coupled to said rotatable member by interlocking, axially extending members having shock absorbing blocks disposed therebetween.

19. A positive engagement clutch as defined in claim 18 wherein said shock absorbing blocks are fabricated from polyurethane.

20. A positive engagement clutch as defined in claim 17 wherein said wedge ring is rotatably mounted about said rotatable member, a portion of said wedge ring being frictionally coupled to said rotatable member.

21. A positive engagement clutch as defined in claim 20 wherein said frictional coupling comprises a first plurality of friction discs concentrically disposed about and axially slidable along said rotatable member and a second plurality of friction discs, said second plurality of friction discs concentrically disposed about and interstitial with said first plurality of friction discs, said second plurality of friction discs being securely coupled to an axial surface of said wedge ring and moveable therewith.

22. A positive engagement clutch as defined in claim 21 including means for imposing axial force upon said first and second plurality of friction disc whereby a preset torque level is established.

23. A positive engagement clutch as defined in claim 17 wherein said frusto-conical rollers are resiliently registered by means comprising shaft extensions axially depending oppositely from each axial terminus of each frusto-conical roller, a pair of retainer springs uniformly suspended from said V-block cam each supporting one of said shaft extensions to retard radially inward movement of said frusto-conical rollers, and a pair of bias springs uniformly suspended from said V-block cam each imposing a resilient radially inward force upon a respective one of said shaft extensions.

24. A positive engagement clutch as defined in claim 17 wherein the angle between each of said transverse adjacent surfaces of said V-block cams and a tangent lateral to said wedge ring and perpendicular to the bisecting line of said pair of adjacent surfaces is greater than the angle whose tangent is equal to the coefficient of friction at the said surfaces.

25. A positive engagement clutch as defined in claim 24 wherein the axial taper of said V-block cam is angularly equal to that of said transverse adjacent surfaces.

26. A positive engagement clutch as defined in claim 24 wherein the axial taper of said wedge ring is angularly equal to that of said transverse adjacent surfaces.

27. A positive engagement clutch as defined in claim 24 wherein said angle is in the range of 14°–15° of arc.

28. A positive engagement clutch as defined in claim 17 wherein said means for slidably moving said wedge ring comprises:
 a. a flange concentric with and integrally depending outwardly from said rotatable member in spaced relation with an axial end of said wedge ring, said flange having a plurality of uniformly distributed apertures in axial alignment with said wedge ring;
 b. push rods slidably contained within said apertures and engaging the adjacent ends of said wedge ring; and
 c. means for alternatively urging said push rods in opposite axial directions whereby said clutch is engaged and disengaged.

* * * * *